United States Patent
McGee et al.

(10) Patent No.: US 7,051,699 B2
(45) Date of Patent: May 30, 2006

(54) SPLIT MODE OPERATION FOR FUEL INJECTION SYSTEMS

(75) Inventors: Brian G. McGee, Chillicothe, IL (US); John P. Timmons, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/602,746

(22) Filed: Jun. 24, 2003

(65) Prior Publication Data

US 2004/0079324 A1 Apr. 29, 2004

Related U.S. Application Data

(60) Provisional application No. 60/420,715, filed on Oct. 23, 2002.

(51) Int. Cl.
*F02B 3/00* (2006.01)

(52) U.S. Cl. ...................................... 123/295; 123/299

(58) Field of Classification Search ................ 123/295, 123/299, 443
See application file for complete search history.

(56) References Cited

U.S. PATENT DOCUMENTS

| | | | |
|---|---|---|---|
| 5,992,372 A * | 11/1999 | Nakajima | 123/295 |
| 6,112,720 A | 9/2000 | Matta | |
| 6,295,973 B1 * | 10/2001 | Yang | 123/543 |
| 6,305,358 B1 | 10/2001 | Lukich | |
| 6,324,835 B1 * | 12/2001 | Surnilla et al. | 123/443 |
| 6,360,713 B1 * | 3/2002 | Kolmanovsky et al. | 123/295 |
| 6,390,054 B1 * | 5/2002 | Yang | 123/295 |
| 6,659,083 B1 * | 12/2003 | Gaessler et al. | 123/443 |
| 2002/0059907 A1 * | 5/2002 | Thomas | 123/43 AA |
| 2002/0157619 A1 * | 10/2002 | Gray | 123/431 |
| 2003/0233996 A1 * | 12/2003 | Marriott et al. | 123/299 |

* cited by examiner

*Primary Examiner*—Erick Solis
(74) *Attorney, Agent, or Firm*—Clifton G. Green; Liell & McNeil

(57) ABSTRACT

Methods for operating a fuel injection system of an engine. A first number of the fuel injectors is operated in a first mode during a first engine cycle. The first mode has a first set of fuel delivery characteristics, including at least one fuel shot per fuel injector per engine cycle. A second number of the fuel injectors is operated in a second mode during the first engine cycle. The second mode has a second set of fuel delivery characteristics, including at least one fuel shot per fuel injector per engine cycle.

18 Claims, 2 Drawing Sheets

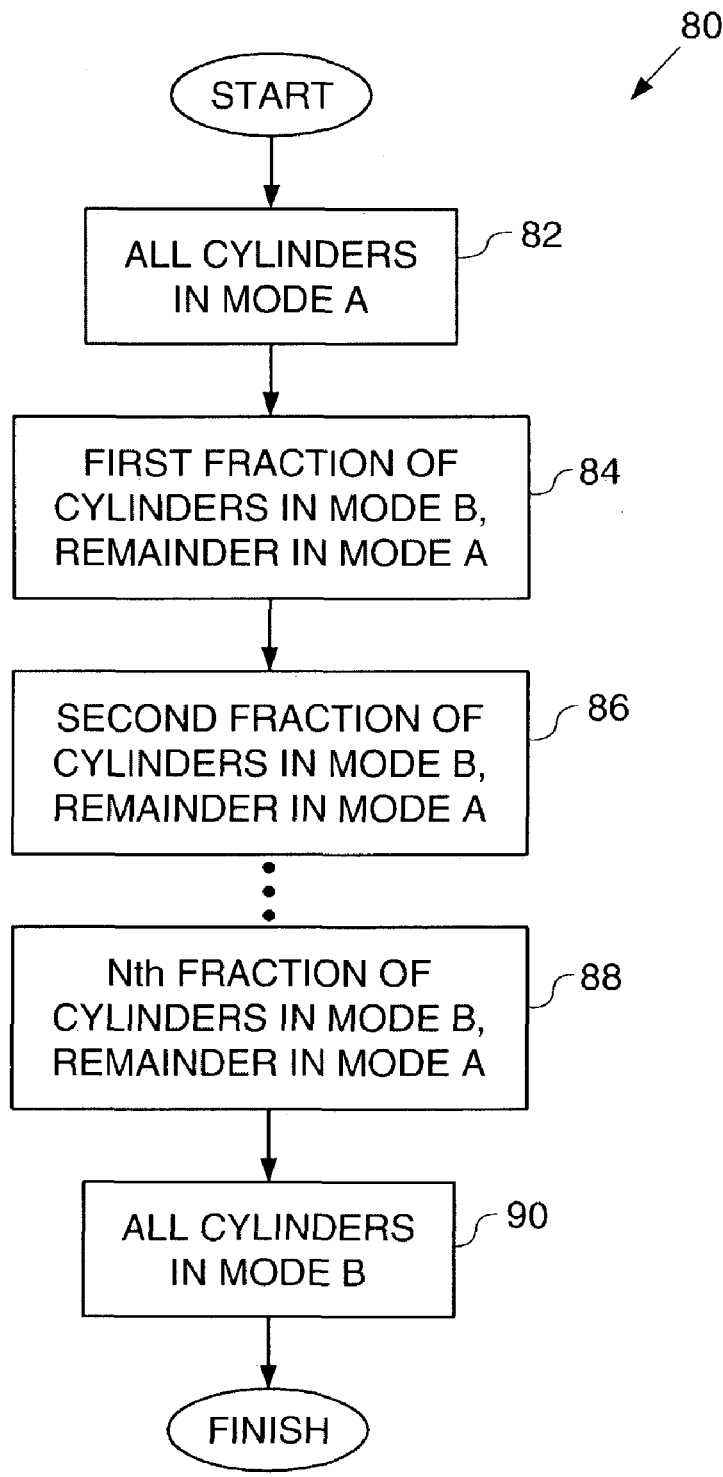

SPLIT MODE OPERATION FOR FUEL INJECTION SYSTEMS

This application claims is the benefit of Provisional application Ser. No. 60/420,715, filed Oct. 23, 2002.

TECHNICAL FIELD

This invention relates generally to fuel injection systems, and more particularly, to operating a first fraction of the fuel injectors in a first mode while operating a second fraction of the fuel injectors in a second mode during a single engine cycle.

BACKGROUND

Electronically controlled direct fuel injection devices such as electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an electronic fuel injection signal received from an electronic fuel injection control device (controller) or system. These signals include waveforms that are indicative of a desired injection rate as well as the desired timing and quantity of fuel to be injected into the cylinders.

Emission regulations pertaining to engine exhaust emissions are becoming more restrictive throughout the world including, for example, restrictions on the emission of hydrocarbons, carbon monoxide, the release of particulates, and the release of nitrogen oxides (NOx). Tailoring the electronic fuel injection current signal waveform and the resulting number of injections and the injection rate of fuel to a combustion chamber during a combustion cycle of the cylinder, as well as the quantity and timing of such fuel injections, is one way to improve emissions and meet higher emissions standards. As a result, multiple fuel injection techniques, wherein the electronic fuel injection signal waveform comprises a plurality of distinct fuel injection signals, have been utilized to modify the burn characteristics of the combustion process in an attempt to reduce emission and noise levels. Multiple fuel injections typically involve splitting the total fuel delivery to the cylinder during a particular injection event into separate fuel injections, such as a pilot injection, a main injection, and an anchor injection, where three injections of fuel (a three shot injection) are desired. Each of these injections may also be referred to generally as a shot, and the term shot as used in the art may also refer to the actual fuel injection or to the command current signal (electronic fuel injection current signal), also referred to simply as a fuel injection signal, to a fuel injector indicative of an injection or delivery of fuel to the engine. At different engine operating conditions, it may be necessary to use different injection strategies in order to achieve both desired engine performance and emissions control.

During normal operation of an engine, the injection strategies may change several times. Typically each injection strategy will differ slightly from the other injection strategies in both the level of noise and amount of torqeu produced. In some instances, the transition from one strategy to another may cause a noticeable "step-change" in either or both of these characteristics and/or other characteristics. This sudden change in characteristics is often undesirable.

SUMMARY OF THE INVENTION

The present invention provides methods for operating a fuel injection system of an engine. A first number of the fuel injectors is operated in a first mode during a first engine cycle. The first mode has a first set of fuel delivery characteristics, including at least one fuel shot per fuel injector per engine cycle. A second number of the fuel injectors is operated in a second mode during the first engine cycle. The second mode has a second set of fuel delivery characteristics, including at least one fuel shot per fuel injector per engine cycle.

BRIEF DESCRIPTION OF THE DRAWINGS

FIG. 2 shows a flowchart for operating the fuel injection system according to one embodiment of the invention.

DETAILED DESCRIPTION

Figure 1:
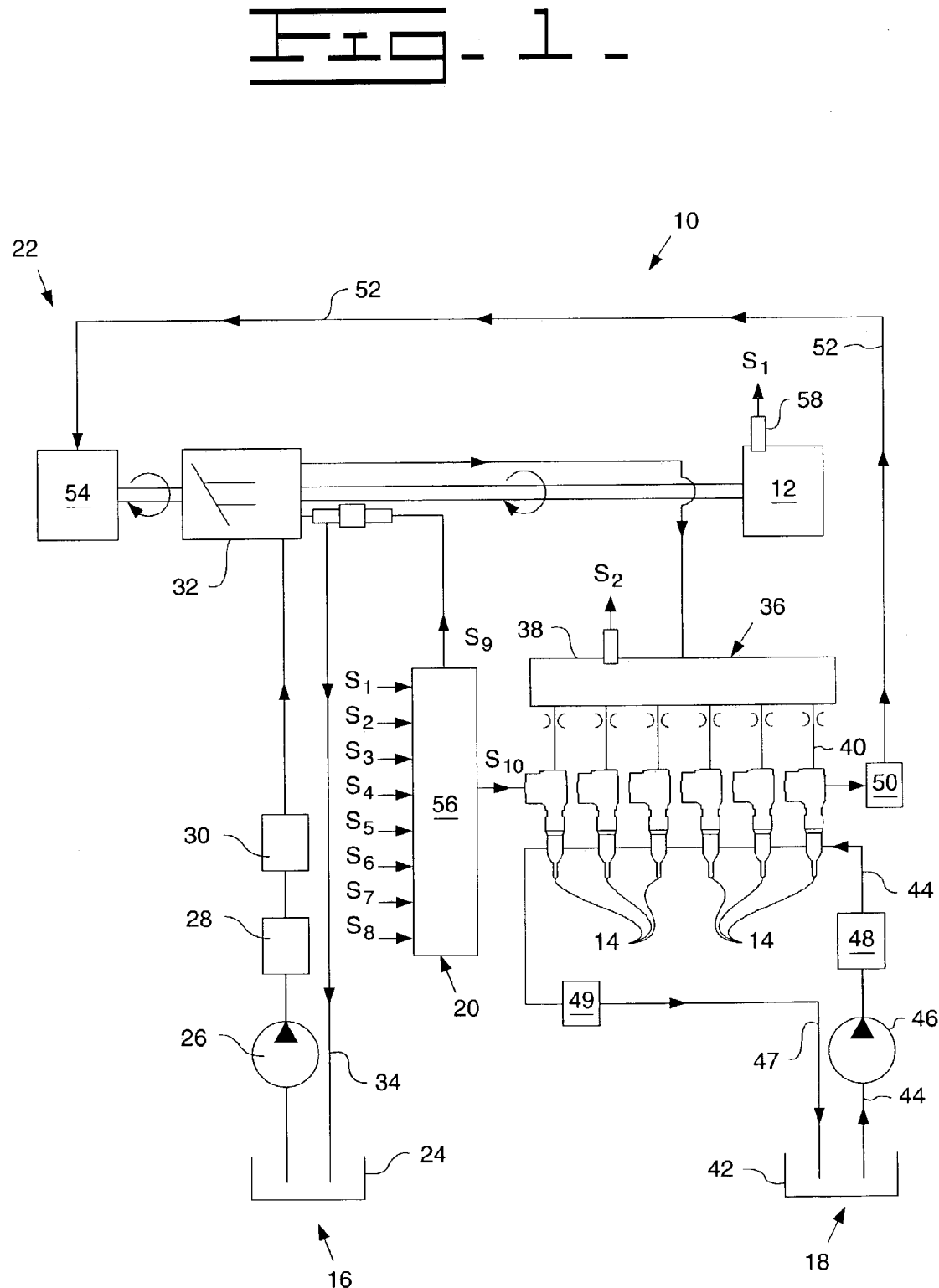
FIG. 1 shows a functional block diagram of a hydraulically actuated electronically controlled fuel injection system 10 according to one embodiment of the invention as adapted for a direct-injection compression ignition engine.

As used throughout this disclosure, an "injection event" is defined as the injections that occur in a particular cylinder or combustion chamber during one cycle of the engine ("cylinder cycle"). For example, one cycle of a four stroke engine for a particular cylinder, includes an intake, compression, expansion, and exhaust stroke. Therefore, the injection event/cylinder cycle in a four stroke engine includes the number of injections, or shots, that occur in a cylinder during the four strokes of the piston. As used in the art, and throughout this disclosure, an "engine operating cycle" or "engine cycle" includes the individual cylinder cycles for the cylinders included therein. For example, an engine cycle for a six cylinder engine will include six individual cylinder cycles, one for each of the cylinders of the engine (with each cylinder cycle having four strokes, for a total of 24 strokes). Generally, the cylinder cycles overlap, so that the beginning of the next successive cylinder cycle of a particular cylinder might begin prior to the completion of the beginning of the next engine operating cycle. The term "shot" as used in the art may also refer to the actual fuel injection or to the command electronic fuel injection current signal (electronic fuel injection current signal), also referred to simply as a fuel injection signal, to a direct fuel injection device, fuel injector or other fuel actuation device indicative of an injection or delivery of fuel to the engine.

FIG. 1 shows a functional block diagram of a hydraulically actuated electronically controlled fuel injection system 10 according to one embodiment of the invention as adapted for a direct-injection compression ignition engine 12. Fuel system 10 includes one or more electronically controlled fuel injection devices, such as a fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any number of cylinders or combustion chambers (not shown). In addition, while the embodiment of FIG. 1 also illustrates a hydraulically actuated electronically controlled fuel injector system, it is likewise recognized and anticipated that the present invention is equally applicable to other types of fuel injection devices, including electronically controlled injectors, mechanically actuated electronically controlled injector units as well as fluid activated common rail type fuel injection systems with digitally controlled fuel valves. The fuel system 10 of FIG. 1 includes an apparatus or means 16 for supplying actuation fluid to each injector 14, an apparatus or means 18 for supplying fuel to each injector, electronic control means 20 for controlling the fuel injection system, including the manner and frequency in which fuel is injected by the injectors 14, for example, including timing, number of injections per injection event, fuel quantity per injection, time delay between each injection, and the injection profile. The fuel injection system 10 may also include apparatus or means 22 for recirculating actuation fluid and/or recovering hydraulic energy from the actuation fluid leaving each injector 14.

The actuating fluid supply apparatus or means 16 preferably includes an actuating fluid sump or reservoir 24, a relatively low pressure actuating fluid transfer pump 26, an actuating fluid cooler 28, one or more actuation fluid filters 30, an actuation fluid high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high-pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131.

Apparatus 22 may include a waste accumulating fluid control valve 50 for each injector (only shown by way of example), a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering apparatus or means 22. A portion of the recirculated actuation fluid is channeled to high-pressure actuation fluid pump 32 and another portion is returned to actuation fluid sump 24 via recirculation line 34.

In one embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of suitable liquid.

The fuel supply apparatus or means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory, which may be a RAM, a ROM, or other type of memory known in the art is connected to the microcontroller or microprocessor and stores instruction sets, maps, lookup tables, variables, and more. This memory may be referred to generally as a data storage. ECM 56 or a portion thereof may be used to control many aspects of fuel injection, including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) electrical current level of the injector waveform, and (10) any combination of the above parameters. Hence, the ECM 56 or a portion thereof will also be referred to as an electronic fuel injection control device or electronic fuel injection control system. Each of the described parameters are variably controllable independent of engine speed and load. ECM 56 receives a plurality of sensor input signals S1–S8 which correspond to known sensor inputs, such as engine operating conditions including engine speed, engine temperature, pressure of the actuation fluid, cylinder piston position and so forth, that are used to determine the desired combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector 14 thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

FIG. 2 shows a flowchart 80 for operating the fuel injection system 10 according to one embodiment of the invention. Initially, in block 82 the fuel injection system 10 is operating in a first mode for all combustion chamber, e.g., cylinders of the engine 12. For example, the first mode may a mode where two fuel shots are delivered into the cylinder during a single cylinder cycle.

In block 84, a first portion or fraction of the fuel injectors is switched from mode A into a mode B. Mode B may be a mode having at least one fuel delivery characteristic that is different from mode A. For example, mode B may be a mode where only a single fuel shot is delivered into the cylinder during a single cylinder cycle. A second portion or fraction of the fuel injectors, such as the remaining fuel injectors not in mode B, operate in mode A. Thus, during block 84, the engine 12 operates for at least one engine cycle with some of the fuel injectors injecting two fuel shots and some of the fuel injectors injecting a single shot per engine cycle.

In one embodiment of the invention, where the engine 12 has six fuel injectors and six cylinders, in block 84 three of the fuel injectors are switched into mode B, and three of them remain in mode A.

In block 86 a second portion or fraction of the fuel injectors is switched from mode A into a mode B. For example, in one embodiment of the invention in block 86 four of the fuel injectors may operate in mode B, while two operate in mode A. During block 86 the engine operates for at least one engine cycle.

Block 86 may be repeated as desired (e.g., block 88), switching additional fuel injectors from mode A into mode B until a desired number of fuel injectors (including zero) are operating in each mode. In one embodiment of the invention for an engine 12 having six fuel injectors and six cylinders, the pattern for operating in modes A and B are respectively (6-0), (3-3), (4-2), (1-5), (0-6). Other patterns for the transition from mode A to B could also be used, such as (6-0), (5-1), (4-2) (3-3), (4-2), (1-5), (0-6), or any combination thereof, including the omission of cylinder combinations as desired.

In other embodiments of the invention, block 86 and block 88 may be omitted.

In block 90 all of the fuel injectors operate in mode B.

Although the first mode has been described above as being a mode where two fuel shots are delivered into the cylinder during a single cylinder cycle, in other embodiments of the invention the first mode could have different characteristics. For example, it could be a different number of shots than two, or it could have different timing characteristics or duration of injection characteristics, or any other characteristic that may be useful in creating a desired effect on the engine 12. In other embodiments of the invention, the same variety of characteristics may also available to the second mode.

Similarly, although in the context of flow chart 80 the invention has been described as operating in the first mode, e.g., mode A, for all of the cylinders, and in a second mode, e.g., mode B, for the remaining cylinders, this need not be the case. Instead, some fraction of the fuel injectors could be operating in mode A, some fraction could be operating in mode B, and a third fraction could be operating in a mode C. In some embodiments of the invention, the sum of the number of fuel injectors operating in modes A and B need not equal the total number of fuel injectors.

INDUSTRIAL APPLICABILITY

The fuel injection strategy disclosed in FIG. 2 may be used to more smoothly transition between two disparate modes of fuel injection. Instead of the more conventional single large transition, the change between modes is broken down into smaller transitions, with the fuel injectors remaining in each state after each transition for some amount of time, or for a specific engine speed range or engine load range. This may have the effect of linearizing the performance of the engine 12 between the two modes of operation, making the change less noticeable or more predictable during the transition.

In addition to being used as a transitioning strategy, the fuel injection strategy may also be used as an additional mode of operation for the engine 12. When operating this way, the fuel injectors 14 for a given engine may have different fuel injection characteristics for a predetermined period of time, such as as long as the engine 12 has a predetermined speed and load.

Finally, it is worth noting that this multi-mode or split mode of operation of the engine 12 need not be initiated on a specific fuel injector 14 or combustion chamber. In embodiments of the invention, the fuel injection strategy may be initiated at the beginning, part-way through, or at the end of an engine cycle, and similarly ended at any of these points. It is not necessary to always begin and end this mode of operation with the fuel injector 14 that supplies fuel to the first combustion chamber, for example.

From the foregoing it will be appreciated that, although specific embodiments of the invention have been described herein for purposes of illustration, various modifications may be made without deviating from the spirit or scope of the invention. Accordingly, the invention is not limited except as by the appended claims.

What is claimed is:

1. A method for transitioning from a first mode of fuel injection operation to a second mode of fuel injection operation in an engine having x combustion chambers, comprising:
    operating in a first mode of fuel injection operation for the x combustion chambers during a first predetermined engine cycle, the first mode of fuel injection including a first number of fuel shots including at least one fuel shot per engine cycle;
    operating in the first mode of fuel injection operation for y combustion chambers, y being a number less than x, during a second predetermined engine cycle;
    operating in the second mode of fuel injection operation for the remaining x-y combustion chambers during the second predetermined engine cycle, the second mode of fuel injection including a second number of fuel shots that is different from the first number and includes at least two fuel shots per engine cycle; and
    operating in the second mode of fuel injection operation for the x combustion chambers during a third predetermined engine cycle.

2. The method of claim 1 wherein the engine cycle comprises an intake, compression, power, and exhaust operation for each combustion chamber of the engine.

3. The method of claim 1, further comprising:
    operating in the first mode of fuel injection operation for z combustion chambers, z being less than x but greater than y, during a fourth predetermined engine cycle, the fourth predetermined engine cycle occurring after the second predetermined engine cycle and before the third predetermined engine cycle; and
    operating in the second mode of fuel injection operation for the remaining x-z combustion chambers during the fourth predetermined engine cycle.

4. The method of claim 1 wherein the engine comprises a reciprocating engine.

5. The method of claim 1 wherein the engine comprises a rotary engine.

6. The method of claim 1 wherein the combustion chambers comprise cylinders.

7. A method for transitioning from a first mode of fuel injection having a first number of fuel shots to a second mode of fuel injection operation having a second number of fuel shots in an engine having x combustion chambers, comprising:
    delivering a first number of fuel shots to the x combustion chambers during a first predetermined engine cycle, the first number of fuel shots being at least one;
    delivering the first number of fuel shots to y combustion chambers, y being a number less than x, during a second predetermined engine cycle;

delivering a second number of fuel shots, which is different from the first number of fuel shots, to the remaining x-y combustion chambers during the second predetermined engine cycle, the second number of fuel shots being at least one; and delivering the second number of fuel shots to the x combustion chambers during a third predetermined engine cycle.

8. A method for operating a fuel injection system of an engine, comprising:

delivering a first number of fuel shots to a first number of combustion chambers during a first engine cycle, the first number of fuel shots being at least one; and delivering a second number of fuel shots different from the first number to a second number of combustion chambers during the first engine cycle, the second number of fuel shots being at least two.

9. The method of claim 8 wherein the engine cycle comprises an intake, compression, power, and exhaust operation for each combustion chamber of the engine.

10. A method for operating a fuel injection system, comprising:

delivering a first number of fuel shots to a first number of combustion chambers, the first number of fuel shots being at least one; and delivering a second number of fuel shots different from the first number to a second number of combustion chambers while the first number of fuel shots is being delivered to the first number of combustion chambers, the second number of fuel shots being at least two.

11. A method for operating a fuel injection system, comprising:

delivering a first number of fuel shots to a first number of combustion chambers during a first predetermined time period, the first number of fuel shots being at least one; and delivering a second number of fuel shots different from the first number to a second number of combustion chambers during the first predetermined time period, the second number of fuel shots being at least two.

12. A method for operating a fuel injection system of an engine, comprising:

operating a first number of the fuel injectors in a first mode during a first engine cycle, the first mode having a first set of fuel delivery characteristics comprising a number of fuel shots, the first set of fuel delivery characteristics including at least one fuel shot per fuel injector per engine cycle; and operating a second number of the fuel injectors in a second mode during the first engine cycle, the second mode having a second set of fuel delivery characteristics different from the first set, and comprising a different number of fuel shots, the second set of delivery characteristics including at least one fuel shot per fuel injector per engine cycle.

13. The method of claim 12 wherein the set of fuel delivery characteristics comprises desired fuel volume of fuel shots.

14. The method of claim 12 wherein the set of fuel delivery characteristics comprises timing of the initiation of fuel delivery.

15. The method of claim 14 wherein the first mode comprises the fuel injector initiating the delivery of fuel at least 4 degrees of crank angle different from the initiation of the delivery of fuel when the fuel injector is in the second mode.

16. A method for operating fuel injectors in an engine having 6 cylinders, comprising:

delivering two shots of fuel to 6 cylinders of the engine during a first engine cycle;

delivering two shots of fuel to 3 cylinders of the engine during a second engine cycle;

delivering one shot of fuel to 3 cylinders of the engine during the second engine cycle;

delivering two shots of fuel to 2 cylinders of the engine during a third engine cycle;

delivering one shot of fuel to 4 cylinders of the engine during the third engine cycle;

delivering two shots of fuel to 1 cylinders of the engine during a fourth engine cycle;

delivering one shot of fuel to 5 cylinders of the engine during the fourth engine cycle; and delivering one shot of fuel to 6 cylinders of the engine during a fifth engine cycle.

17. The method of claim 16 wherein the first through fifth engine cycles occur chronologically in the order of first, second, third, fourth, and fifth.

18. The method of claim 16 wherein the first through fifth engine cycles occur chronologically in the order of fifth, fourth, third, second, and first.

* * * * *